United States Patent [19]

Dhawan et al.

[11] Patent Number: 4,622,685
[45] Date of Patent: Nov. 11, 1986

[54] RTS/DCD SIMULATOR

[75] Inventors: Sadhu R. Dhawan, Miramar; Jessie Chao, Miami, both of Fla.

[73] Assignee: Racal Data Communications Inc., Miami, Fla.

[21] Appl. No.: 739,570

[22] Filed: May 30, 1985

Related U.S. Application Data

[63] Continuation of Ser. No. 363,203, Mar. 29, 1982, abandoned.

[51] Int. Cl.⁴ .................. H04B 1/38; H04L 23/00
[52] U.S. Cl. .................................. 375/121; 375/8
[58] Field of Search .................. 370/24, 29, 32, 92, 370/86, 94, 79–84; 375/8, 114, 121; 179/2 DP, 3, 4; 178/69; 340/825.06, 825.29, 825.52

[56] References Cited

U.S. PATENT DOCUMENTS 3,633,164  1/1972  Hynes et al. .................. 375/121
3,747,067  7/1973  Fox et al. .................. 375/8
3,810,155  5/1974  Widl et al. .................. 375/8
4,044,307  8/1977  Borysiewicz et al. .................. 375/8
4,317,207  2/1982  Fujimura et al. .................. 375/121

Primary Examiner—Douglas W. Olms
Assistant Examiner—Wellington Chin
Attorney, Agent, or Firm—Jerry A. Miller

[57] ABSTRACT

Apparatus for controlling RTS/DCD simulation in a data receiver by detecting, after the received data transmitted for assignment to a particular data terminal, the presence of a two-part code having a repetitive stream of binary 1's or 0's (or repeating sequences thereof) as the first part; and for thereafter detecting the presence of a preselected coded sequence of bits within a preselected number of succeeding bits received as the second part of said two-part code. The preselected two-part code is advantageously chosen to be one whose probability of occurrence in customer data is extremely remote.

11 Claims, 4 Drawing Figures

RTS/DCD SIMULATOR

This is a continuation of application Ser. No. 363,203, filed on Mar. 29, 1982, now abandoned.

BACKGROUND AND SUMMARY OF THE INVENTION

This invention relates to the field of modulator-demodulators (modems) used for digital data transfer, and more particularly to an improvement in multiplexed modems which transmit data over one or more selected channels, wherein one or more of such channels may be periodically inactive while transmission is occurring on one or more of the other channels.

It is known in the art to interface data terminal equipment (DTE) with a modem that has several e.g., four output ports, each connected to a transmission channel with a remote modem on the other end of the transmission channel. For economy in transmitting data, it is known to multiplex the output channel on a time sharing basis. This decreases the number of pieces of equipment necessary for several DTE's to be able to communicate with a plurality of DTE modems at, multiple locations, which may be in remote locations and communicated to over telephone lines, or at a central location to the DTE and communicated to over fixed wire connections. Prior to multiport modems the DTE had to have several modems attached to it, one for each corresponding port on present multiport modems.

It has been found, however, that one feature of replacing multiple modems connected to the DTE with a multiport modem connected to the DTE, is that when a port goes inactive it no longer is connected to a communication channel and the indication to the DTE is that the channel is off-line, i.e., the indication is that the channel is not in either a Request-to-Send (RTS) or Data Carrier Detect (DCD) mode. This contrasts to the prior art use of a plurality of modems between the DTE and each transmission channel, wherein the communication link between that modem and a modem to which it was communicating was not broken, though there was a pause in data transmission from the one DTE to a DTE or further remote modem connected to the remote modem on the channel. In that event the appropriate RTS and DCD signals remained in a proper status during pauses in data transmission because the carrier remained up between the modems, though no data was being sent.

There are certain benefits to keeping the proper RTS and DCD signals to the DTE when data is not being sent. For example, as referred to in U.S. Pat. No. 4,044,307, assigned to the assignee of the present application, the disclosure of which is hereby incorporated by reference, the time lost in ensuring that equalization is present after each apparent loss of carrier could significantly detract from the time savings in data transmission enabled by multiported modems.

In addition, similar problems arise at the receiving modem if it is a multiport modem connected to several DTE's or further remote modems. These DTE's or further remote modems would indicate a loss of RTS or DCD, as appropriate, when the respective port to which one of them is connected becomes inactive during multiplexing.

With a DCD/RTS simulator a multiport modem can be made to operate in a continuous carrier fashion. Normally in a continuous carrier mode the local DTE, desiring to communicate to a remote modem, sends a Request-to-Send (RTS) signal to a local modem connected to the local DTE. In order for this to occur, the data set (modem) must have its power on, in which event it transmits to the DTE a data set ready (DSR) signal which enables the DTE to transmit to that modem an RTS signal. If the local modem detects the presence of a carrier on the transmission link to the remote modem, which transmission link may, e.g., be a telephone line, a four-wire half duplex or a two-wire full duplex transmission link, then the modem is prevented from generating and transmitting to the DTE a Clear-to-Send (CTS) signal, because data is being received from a remote modem on that channel.

Carrier signal detect may be in the form of a delayed carrier signal detect (DCD) which is a signal output of the modem upon detecting a carrier signal (CXR detect) with a given time delay before generation of the DCD signal.

In a multiport system, it is important to keep the proper DCD/RTS signals even though a port may become temporarily inactive. It is also important to prevent the means used to accomplish this function from interfering with or confusing actual data being transmitted on the data channels. Thus various coding schemes have been used in the past to key the multiport modem into simulating a DCD or RTS signal, as appropriate. These have suffered from the drawback that they could be confused with actual customer data being transmitted. Typical keys have included repeating strings of bits, e.g., "0000...00," "1111...11" or "1010 ...10."

SUMMARY OF THE INVENTION

The present invention relates to a new manner of signaling to a remote modem to drop DCD, meaning that an actual cessation of data transmission is occurring rather than a temporary cessation due to multiport operation at the sending modem. A feature of the present invention is to provide a coded signal which, when received by a remote modem, will cause it to drop DCD and which must be received before DCD is so dropped. The coded signal is such as to virtually assure that it will not be duplicated by customer data being transmitted, so as to prevent inadvertent dropping of DCD, and also to assure that it will not be falsely included in customer data as received by the remote modem or DTE.

The problems enumerated in the foregoing are not intended to be exhaustive, but rather are among those which tend to impair the effectiveness of prior multiport modem operation. Other noteworthy problems may also exist; however, those presented above should be sufficient to demonstrate that prior multiport modems have features which are not entirely satisfactory.

Examples of the more important features of the present invention have been summarized above rather broadly so that the detailed description thereof that follows may be better understood, and the contribution to the art better appreciated. There are, of course, additional features of the invention that will be described hereinafter and which will also form the basis of the appended claims. These features of the present invention will become apparent with reference to the following detailed description of a preferred embodiment thereof in connection with the accompanying drawings, in which:

DETAILED DESCRIPTION OF A PREFERRED EMBODIMENT

Figure 1:
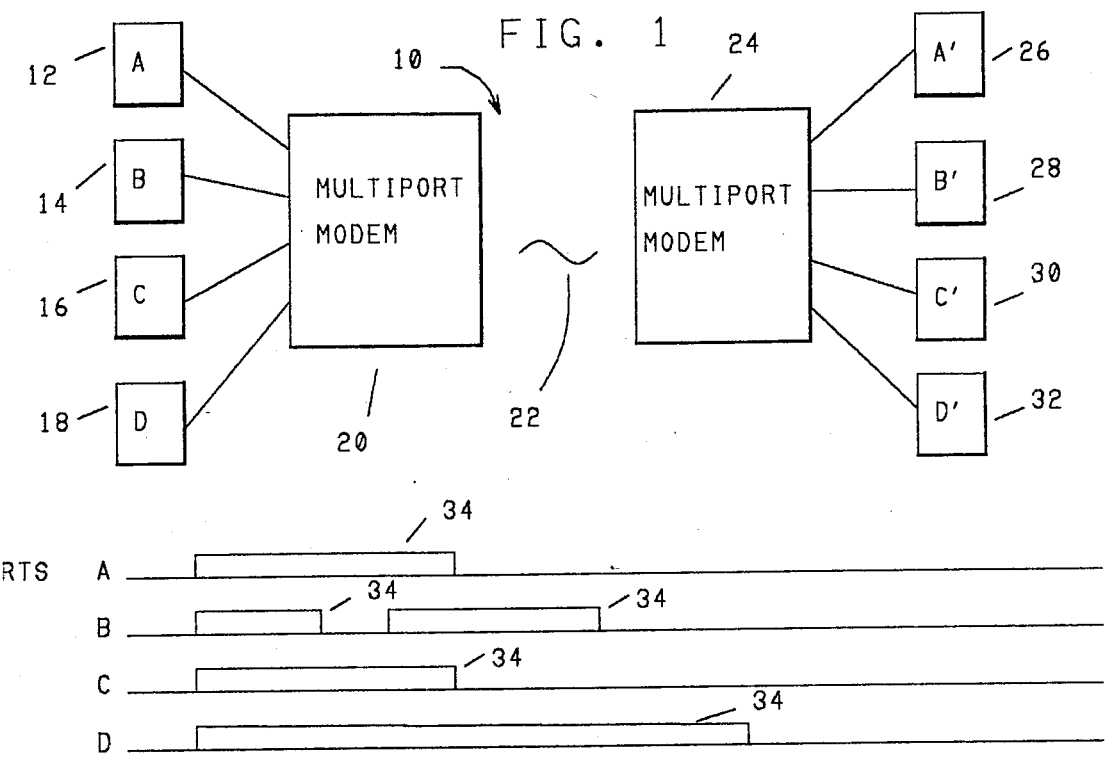
FIG. 1 shows a block diagram of a prior art multiported modem transmission network.

Turning now to FIG. 1, a prior art block diagram of a multiported modem transmission network capable of 10 employing the present invention is shown. The transmission network includes four data sources, e.g., DTE's A, B, C and D, 12, 14, 16 and 18, respectively. Each DTE 12, 14, 16 and 18 is connected to a modem 20 which is capable of multiplexing its output on a transmission line 22, which may be, e.g., a telephone line. The multiplexing enables the modem 20 to time share the data transmission over the transmission link 22 between the sources of data, 12, 14, 16 and 18 to maximize the use of the transmission link 22. A system for a modem having automatic port reconfiguration apparatus suitable for use of this invention is fully described in U.S. Pat. No. 4,270,202, issued May 26, 1981, and assigned to the assignee of this application.

A remote modem 24 is connected at the opposite end of the transmission link 22 and in turn is connected to data sinks A', B', C' and D', respectively 26, 28, 30 and 32. The remote modem is also capable of multiplexing its received data to the appropriate data sink 26, 28, 30 or 32. It will be understood that the data sinks 26, 28, 30 and 32 could be, e.g., DTE's or further remote modems for transmitting data to additional locations. It is assumed for purposes of explanation of the present invention and for simplification of the discussions thereof that the data sinks 26, 28, 30 and 32 are DTE's receiving the transmitted data for use therein and, also, that the multiport modems 20 and 24 are transmitting the data from DTE's A, B, C and D to, respectively, DTE's, A', B', C' and D'. It will be understood, however, that this need not be the case as, e.g., all of the DTE's A, B, C or D could be sending data destined for only one or several, but not all of the DTE's A', B', C' or D'. In addition, any DTE A, B, C or D might be sending data destined, during different sending periods, for different ones of the DTE's A', B', C' or D'. Thus, e.g., DTE's A and B could be sending data, while DTE's C and D are inactive, and this data could be destined, e.g., to only DTE D'. Further, e.g., DTE A could be sending data which is destined for DTE A', followed by data destined for DTE B'. The multiport modems 20, 24 function to multiplex the data so sent by DTE's A, B, C and D onto the transmission link 22 and to assign the received data to the appropriate data sinks 26, 28, 30 and 32.

Figure 2:
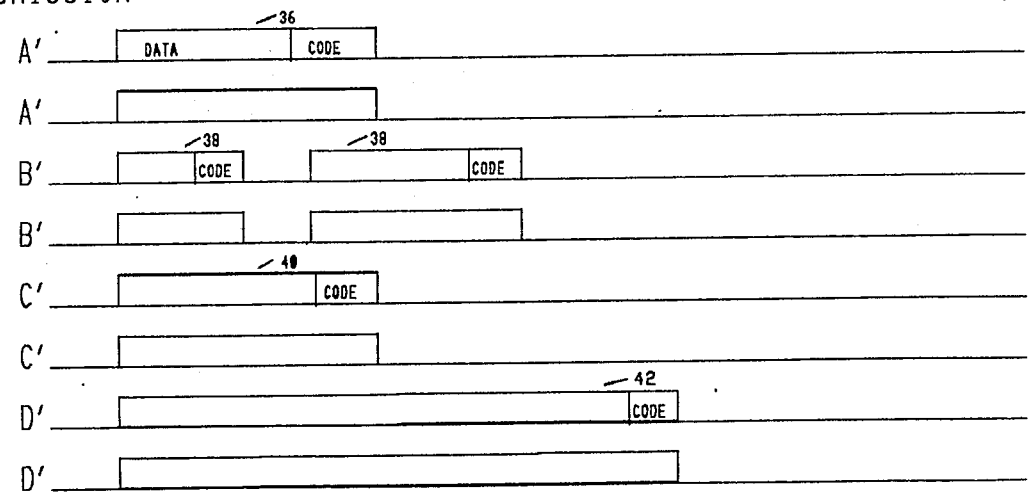
FIG. 2 shows a diagrammatic repesentation of the coded signal which alone is sufficient to cause DCD to drop at a remote modem.

Turning now to FIG. 2, it can be seen that DTE's A, B, C and D can at various times and for various periods have data to send, which is indicated by the presence of the RTS (Request-to-Send) signal 34. RTS is transmitted through modems 20 and 24 to the appropriate remote data sink in this case it is assumed to be the correspondingly prime designated DTE A', B' C' or D', which returns a DCD signal to the respective sending DTE A, B, C or D through modems 24 and 22. This enables the sending DTE A, B, C or D to output its data, respectively 36, 38, 40 and 42 to multiport modem 20 for multiplexing onto the transmission link 22 for receipt and multiport distribution to the appropriate data sink A', B', C' or D'.

Due to the operation of the multiport modems 20 and 24, the respective data trains from the respective DTE's A, B, C or D may not be sent as a continuous stream, but may be broken up and multiplexed with the data streams from another DTE A, B, C or D on a real-time basis. Thus the appropriate data sink, e.g., A' will likely receive the data 36 from DTE A in two or more distinct streams of data, totaling the data stream 36. When DTE A' is not actually receiving a data stream from remote modem 24, its DCD must still be maintained for the above-described reasons.

The multiport modem 20 senses when the respective DTE A, B, C, or D drops its RTS signal, indicating data is no longer forthcoming, and adds to the end of the data stream a coded signal which is transmitted to remote modem 24 as part of the data destined for the appropriate data sink A', B', C' or D'. The remote modem 24 senses the transmission of this coded signal in the data it is multiplexing to a respective one of the data sinks A', B', C' or D' and transmits a signal to the appropriate one of those data sinks A', B', C' or D' to cause it to drop its DCD signal.

The coded signal which has been selected in accordance with the present invention is a relatively long string of binary 1's, e.g., at least 128, 64, 32 or 24, followed by an additional code word of, e.g., eight bits in length, which is repeated, e.g., three times.

The remote modem 24 has logic circuitry which detects the existence in the received data for an appropriate DTE A', B', C' or D' of a stream of 1's of a number slightly less than the transmitted stream, e.g., 120, 60, 24 or 18, within any given block of data received of a length, respectively, of 128, 64, 32 or 24. This is in order to account for some possible transmission errors. Detecting this binary stream in the incoming data activates additional logic circuitry within the remote modem 24 to hold and sample the succeeding data in groups, e.g., of six bits, to detect the presence of a code, e.g., 01, 1001, i.e., 19 in hexadecimal, in any of the next succeeding, e.g., three six-bit groups. This redundancy is also provided for purposes of accounting for possible transmission errors within one or two of the six-bit groups.

If the code is found, the remote modem 24 transmits a signal to the appropriate DTE A', B', C' or D' to drop its DCD signal. If it is not found, then the stored data being examined to detect the code is customer data rather than the code, and is assigned to the appropriate DTE A', B', C' or D' as such.

This code arrangement has the advantage over prior coded signals for simulation of DCD in multiport operaton in their prior use of long repetitive strings of data bits, e.g., 0's, 1's or 01's could appear in customer data at times, and be mistaken for a drop DCD code, which would result in inadvertent termination of receipt of data at the respective DTE A', B', C' or D'. The requirement that, in effect, two codes be found simultaneously, i.e., a stream of repeating data bits of some minimum length and a following code word of, e.g., eight bits, greatly decreases the likelihood that the code will appear in actual customer data. The longer the string of repeating data as the first part of the coded signal, the lesser this likelihood is that customer data will contain the coded signal.

Figure 3:
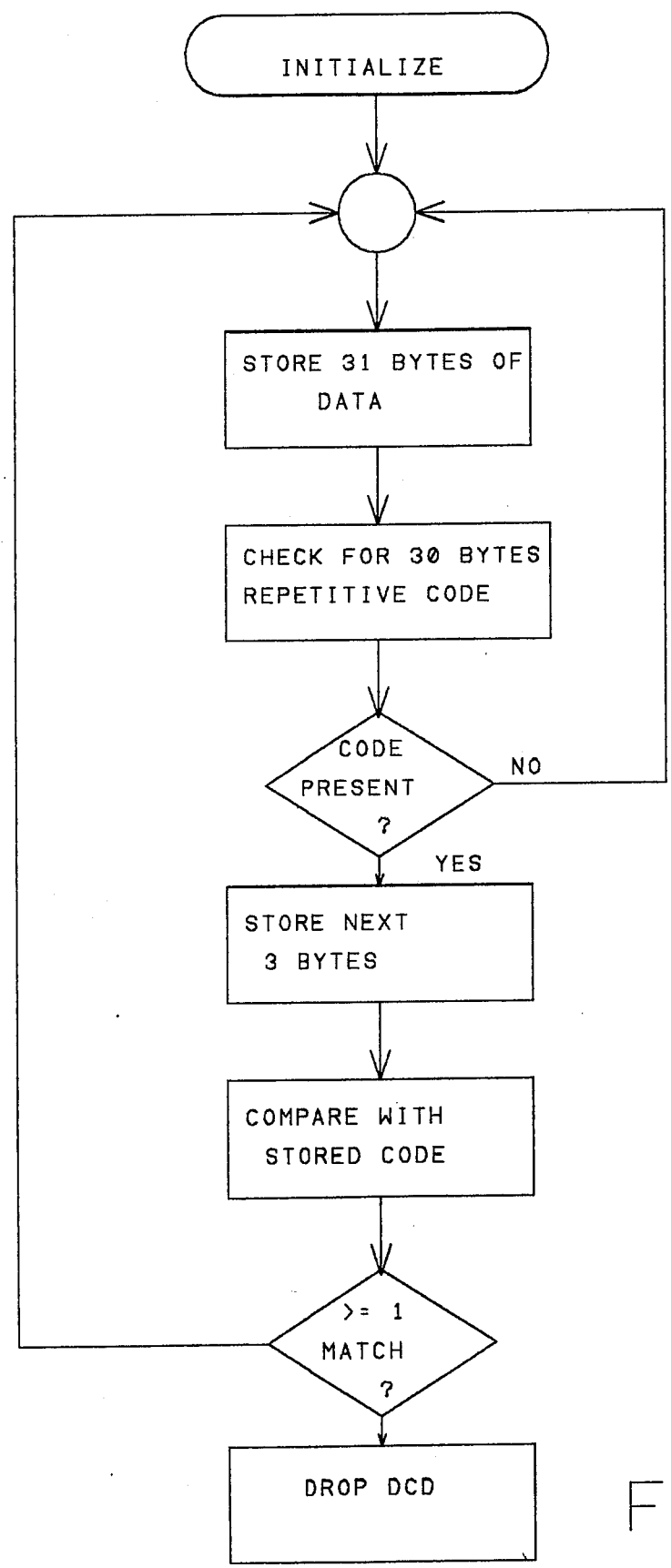
FIG. 3 shows a block diagram of a multiport modem according to the present invention.
Figure 4:
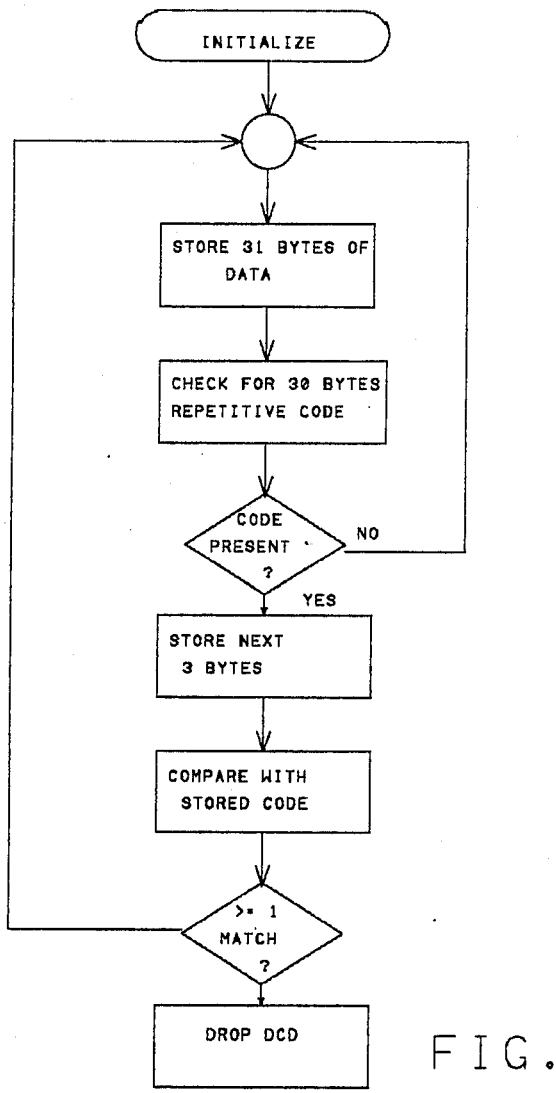
FIG. 4 shows a flow chart of the operation of the multiport modem depicted in the FIG. 3.

Consider now FIGS. 3 and 4. The coded signal detection in the remote modem 24 may be implemented by use of a microprocessor. It will be understood that other large-scale integrated circuitry expressly designed for the required logic functions could also be used. Within the remote modem 24 is at least one microprocessor which may, e.g., be an eight-bit byte microprocessor. As the data which has been demodulated by the remote modem 24 and assigned to the port connected to, e.g., DTE A' is supplied to DTE A', it is stored by the microprocessor in eight-bit bytes in selected memory locations within the RAM (random access memory) of the microprocessor. These memory locations at any given time are thus representative of the last, e.g., 128 bits (31 bytes) of data assigned to A'. Stored within some other memory locations in, e.g., a ROM contained within the microprocessor, is the selected code for the selected lower number of bytes, e.g., 30, i.e., 120 bites. The microprocessor is programmed to compare the preceding 31 bytes, i.e., 128 bits, to determine if any combination of 30 such bytes thereof each contain the selected repetitive code, e.g., 0's, 1's or 01's. If a transmission error has occurred in one of the preceding 31 bytes, the requirement that the repetitive code only be found in 30 such bytes accounts for a possibility of transmission error. Upon detection of the repetitive code in the required number of bytes from the preceding 31 bytes, the microprocessor is programmed to store in its RAM the next succeeding preselected number, e.g., three, eight-bit bytes received, and to compare each against another code stored in memory, either RAM or ROM as desired. This other code is, e.g., 011001. If any of the preselected number of bytes contains the selected other code, the microprocessor is programmed to provide an output to the appropriate data sink, e.g., DTE A' to drop DCD.

The foregoing description of the invention has been directed to a particular preferred embodiment in accordance with the requirements of the Patent Statutes and for purposes of explanation and illustration. It will be apparent, however, to those skilled in this art that many modifications and changes in both the apparatus and method of the present invention may be made without departing from the spirit or scope of the present invention. For example, the particular separate code selected, i.e., 011001 is selected because of its unlikely occurrence in customer data, but could well be any randomly-selected combination of eight binary 1's and 0's. Further, the separate code could be based upon, e.g., one or two eight-bit bytes. The particular means discussed above for accounting for possible transmission errors in the repeating stream or the separate code, could also be easily modified, as will be understood by those skilled in the art, e.g., by determining if some lesser number, e.g., 28 bytes out of the 31 (in the example where the repeating stream transmitted is of 128 bytes) each contain the proper repeating sequence, or, further, determining whether two of the three following bytes contain the proper selected separate code. Further still, more or less than three following bytes could be employed, with a requirement that some number less than the total of such bytes be found to have the selected separate code, thereby accounting for a possible transmission error in one or more of those bytes. These and other modifications of the present invention will be apparent to those skilled in the art. It is the Applicants intention to claim such modifications and variations as fall within the spirit and scope of the invention.

What is claimed is:

1. In a remote data receiver/transmitter adapted for use with a local multiport data receiver/transmitter having a plurality of transmission ports, each adapted to be connected through a transmission link to the remote data receiver/transmitter, and adapted to be connected to a respective one of a plurality of first data terminals for communication of data from the respective one of the first data terminals to a respective one of a plurality of second data terminals, each connected to one of a plurality of transmission ports of the remote data receiver/transmitter, the improvement in means for maintaining RTS/DCD simulation unless actual data termination occurs, said improvement comprising:

means in said transmitter for transmitting a two-part code indicative of termination of actual data, said first part of said two-part code comprising a predetermined stream of binary 1's or 0's of a fixed and preselected number of binary bits, and the second part of said two-part code being a predetermined number of occurrences of a preselected code sequence;

means in said receiver for detecting the presence in the data, transmitted for assignment to the respective second data terminal, of a repetitive stream of binary 1's or 0's or operating sequences thereof which is less in number than the transmitted number of bits in said predetermined stream for affording protection against possible transmission errors, and for thereafter detecting the presence of at least one occurrence of a preselected coded sequence of bits within a preselected number of succeeding bits received, wherein said preselected number of succeeding bits includes a plurality of said preselected coded sequences of bits; and means in said receiver/transmitter responsive to said detection means upon detection of both parts of said two-part code for appropriately dropping the DCD/RTS signal.

2. The multiport data receiver/transmitter of claim 1 wherein said transmitted repetitive stream includes a stream of consecutive binary 1's.

3. The multiport data receiver/transmitter of claim 1 wherein the second part of said two-part code comprises a coded sequence of six digits.

4. The multiport data receiver/transmitter of claim 1 wherein said preselected code comprises a six-digit code repeated three times.

5. The multiport data receiver/transmitter of claim 3 wherein said preselected number of coded sequences comprises the number "19" in a hexadecimal code.

6. The multiport data receiver/transmitter of claim 1 wherein said second part of said two-part code comprises the number "19" in a hexadecimal code repeated three times.

7. A method of controlling RTS/DCD simulation by a data modem to a data terminal comprising the steps of:

transmitting a two-part code sequence indicative of termination of actual data transfer;

including, as a first part of said two-part code, a predetermined number of bits in a repetitive stream of binary 1's or 0's, or operating sequences thereof, and including, as a second part of said two-part code, a preselected code sequence following said binary stream;

detecting the presence in the bit stream transmitted for assignment to a data terminal of a second predetermined number of bits less than the transmitted predetermined number in said repetitive stream and for thereafter detecting the presence of at least one occurrence of said preselected coded sequence from within said preselected number of occurrence; and altering, in response to detection of both parts of said two-part code, the RTS/DCD simulation signal.

8. A method in accordance with claim 7, comprising the additional step of using, as the second part of the two-part code, a six-digit code.

9. A method in accordance with claim 7, comprising the additional step of using, as the second part of the two-part code, a six-digit code repeated three times.

10. A method in accordance with claim 7, comprising the additional step of using, as the second part of the two-part code, the number 19 expressed as a hexadecimal code.

11. A method in accordance with claim 7, comprising the additional step of using, as the second part of the two-part code, the number 19 expressed as a hexadecimal code repeated three times.

* * * * *